United States Patent
Oh

(10) Patent No.: US 9,231,778 B2
(45) Date of Patent: Jan. 5, 2016

(54) METHOD AND APPARATUS FOR MANAGING CONTROL OWNERSHIP FOR APPLICATION OF REMOTE USER INTERFACE SERVER

(75) Inventor: Seung-jae Oh, Seoul (KR)

(73) Assignee: SAMSUNG ELECTRONICS CO., LTD., Suwon-si (KR)

(*) Notice: Subject to any disclaimer, the term of this patent is extended or adjusted under 35 U.S.C. 154(b) by 1124 days.

(21) Appl. No.: 12/123,008

(22) Filed: May 19, 2008

(65) Prior Publication Data

US 2008/0288875 A1    Nov. 20, 2008

Related U.S. Application Data

(60) Provisional application No. 60/938,720, filed on May 18, 2007.

(30) Foreign Application Priority Data

Oct. 10, 2007 (KR) .................. 10-2007-0102149

(51) Int. Cl.
*G06F 3/00* (2006.01)
*G06F 3/048* (2013.01)
*H04L 12/28* (2006.01)
*G06F 15/177* (2006.01)

(52) U.S. Cl.
CPC .................... *H04L 12/282* (2013.01)

(58) Field of Classification Search
USPC ......... 715/700, 733, 736, 740–743, 748, 749, 715/764, 810
See application file for complete search history.

(56) References Cited

U.S. PATENT DOCUMENTS

| 6,026,440 A * | 2/2000 | Shrader et al. | 709/224 |
| 6,157,944 A * | 12/2000 | Pedersen | 709/204 |
| 6,370,552 B1 * | 4/2002 | Bloomfield | 715/234 |
| 6,725,238 B1 * | 4/2004 | Auvenshine | 1/1 |
| 7,027,975 B1 * | 4/2006 | Pazandak et al. | 704/9 |
| 7,047,177 B1 * | 5/2006 | Lee et al. | 703/22 |
| 7,111,298 B1 * | 9/2006 | Michael et al. | 718/104 |
| 7,415,556 B2 * | 8/2008 | Kawachiya et al. | 710/244 |
| 7,600,227 B2 * | 10/2009 | Brockway et al. | 717/176 |
| 7,664,869 B2 * | 2/2010 | Baker et al. | 709/230 |

(Continued)

FOREIGN PATENT DOCUMENTS

| KR | 10-2002-0025517 A | 4/2002 |
| KR | 10-2002-0055216 A | 7/2002 |

(Continued)

OTHER PUBLICATIONS

Walter Dees and Paul Shrubsole, Web4CE: Accessing web-based applications on consumer devices, May 8-12, 2007, 3 pages.*

(Continued)

*Primary Examiner* — Yongjia Pan
(74) *Attorney, Agent, or Firm* — Sughrue Mion, PLLC

(57) ABSTRACT

Provided is a remote user interface (RUI). An RUI server inserts a newly defined object to a user interface (UI) page so as to manage control ownership of an application, and a RUI client controls an application of the RUI server after obtaining control ownership of the corresponding application by using the newly defined object. Accordingly, RUI clients can control the application of the RUI server without conflict, even when a separate plug-in program is not installed in the RUI clients.

19 Claims, 6 Drawing Sheets

(56) References Cited

U.S. PATENT DOCUMENTS

| | | | |
|---|---|---|---|
| 7,913,105 B1 * | 3/2011 | Ganesh et al. | 709/224 |
| 8,484,309 B2 * | 7/2013 | Bong et al. | 709/217 |
| 8,924,592 B2 * | 12/2014 | Jakubowski | 709/248 |
| 2002/0095584 A1 * | 7/2002 | Royer et al. | 713/183 |
| 2004/0145605 A1 * | 7/2004 | Basu et al. | 345/740 |
| 2007/0078987 A1 * | 4/2007 | Walker et al. | 709/227 |
| 2007/0174424 A1 * | 7/2007 | Chen et al. | 709/217 |
| 2007/0180447 A1 * | 8/2007 | Mazzaferri et al. | 718/1 |
| 2007/0260702 A1 * | 11/2007 | Richardson et al. | 709/217 |
| 2008/0052347 A1 * | 2/2008 | Jung et al. | 709/203 |
| 2008/0155663 A1 * | 6/2008 | Knowlson et al. | 726/5 |
| 2008/0201450 A1 * | 8/2008 | Bong et al. | 709/219 |
| 2009/0222903 A1 * | 9/2009 | Sherkin et al. | 726/10 |
| 2010/0299718 A1 * | 11/2010 | Roever et al. | 726/1 |

FOREIGN PATENT DOCUMENTS

| | | | |
|---|---|---|---|
| KR | 10-2004-0019178 A | | 3/2004 |
| KR | 10-2007-0047122 A | | 5/2007 |
| WO | 0057296 A1 * | | 5/1999 |
| WO | 9922332 A1 * | | 9/2000 |

OTHER PUBLICATIONS

Application.Unlock Method, Jan. 19, 2005, 3 pages.*

Remote Desktop Connection, Nov. 28, 2006, 1 page.*

Communication dated Nov. 19, 2012 issued by the Korean Intellectual Property Office in counterpart Korean Patent Application No. 10-2007-0102149.

* cited by examiner

METHOD AND APPARATUS FOR MANAGING CONTROL OWNERSHIP FOR APPLICATION OF REMOTE USER INTERFACE SERVER

CROSS-REFERENCE TO RELATED PATENT APPLICATION

This application claims the benefit of U.S. Provisional Application No. 60/938,720, filed on May 18, 2007, in the U.S. Patents and Trademark Office, and Korean Patent Application No. 10-2007-0102149, filed on Oct. 10, 2007, in the Korean Intellectual Property Office, the disclosure of which are incorporated herein in their entirety by reference.

BACKGROUND OF THE INVENTION

1. Field of the Invention

Methods and apparatuses consistent with the present invention relate to a remote user interface (RUI), and more particularly, to a method of an RUI server providing a user interface to an RUI client.

2. Description of the Related Art

Studies for improving a home network technology are actively being conducted by various industry standard groups, such as DLNA (Digital Living Network Alliance), HAVi (Home Audio-Video Interoperability), and UPnP (Universal Plug and Play).

In a home network, remote user interface (RUI) technology may be used for a device to control functions of another device. In brief, the RUI technology is based on a client-server architecture, in which an RUI client receives a user interface (UI) from an RUI server, such that a user can control the RUI server via the UI in the RUI client.

CEA-2014, which is the standard for an RUI, defines an UPnP network, and a protocol and frame work for an RUI in the Internet. According to CEA-2014, an UPnP device (an RUI server) provides an UI as a web page in a CE-HTML form, and a user remotely controls an application of the UPnP device through the web page. CE-HTML is a particular version of HTML and is based on XHTML.

FIG. 1 is a diagram for describing a conventional communication method between a RUI server and an RUI client according to the CEA-2014 standard.

In order to use an RUI in a home network, discovery for the RUI server should be performed first. Since CEA-2014 is based on an UPnP network, the RUI server is discovered via an UPnP discovery process. In FIG. 1, the RUI client and a control point (CP) are separately illustrated, but when an UPnP CP is embedded in the RUI client, the RUI client directly searches for the RUI server. If the CP is not embedded in the RUI client and a separate CP transmits an UI of the RUI server to the RUI client, the CP not embedded in the RUI client also searches for the RUI client via the UPnP discovery process.

After the UPnP discovery process, the RUI client obtains an UI page by referring to a uniform resource locator (URL) including the UI page in an UPnP device description. In more detail, an XHTML browser of the RUI client requests the UI page to a web server of the RUI server. Since the UI page is formed to control an application of the RUI server, the RUI client controls the application of the RUI server by using the UI page. The conventional method is described in detail in documents such as the CEA-2014 standard, and thus detailed descriptions thereof will be omitted.

As described above, a conventional RUI is based on a structure of general web server-HTML browser. The general web server does not manage access of a browser, and only returns a page that is required by the browser. Accordingly, a web server is not aware whether a request of a certain browser for a page is granted, and thus the web server cannot manage access of the RUI client.

However in the CEA-2014 standard, when the web server does not simply provide information to the RUI client but controls the provided information, i.e. functions of the RUI server through the UI page, authority of the RUI client should be controlled. This is because conflicts may occur when a user controls a device while another user controls the same device.

Accordingly, when access or session between the RUI client and the RUI server is to be managed, a separate database for managing access of each user is included in the web server, or the RUI client uses a plug-in, such as active X, for each application. However generally, a consumer electronics (CE) device uses various operating systems and does not have sufficient resources, and thus additional plug-ins cannot be freely installed.

SUMMARY OF THE INVENTION

The present invention provides a method of controlling an application of a remote user interface (RUI) server without conflicts, even when a separate plug-in is not installed in an RUI client, as the RUI server defines an object for managing control ownership to a user interface (UI) page.

According to an aspect of the present invention, there is provided a method allowing a remote user interface (RUI) client to control an application of an RUI server, the method including: receiving an UI page including a predetermined plug-in object from the RUI server; determining whether the application is controlled by another RUI client by using the plug-in object; and selectively controlling the application based on the determination.

The RUI client and the RUI server may follow the CEA-2014 standard.

The determining may include inquiring of the RUI server whether the application is under control by executing a predetermined method of the plug-in object, when an event for opening the UI page is generated.

The selective controlling may include obtaining control ownership of the application by executing a predetermined method of the plug-in object, when it is determined that the application is not controlled by another RUI client.

The method may further include periodically notifying the RUI server that the application is under control by periodically executing a predetermined method of the plug-in object while controlling the application.

The method may further include releasing the control ownership of the application by executing a predetermined method of the plug-in object while controlling the application.

According to another aspect of the present invention, there is provided an RUI client including: a receiver, which receives an UI page including a predetermined plug-in object from an RUI server; a determiner, which determines whether an application of the RUI server is controlled by another RUI client by using the plug-in object; and a controller, which selectively controls the application based on the result of determination performed by the determiner.

According to another aspect of the present invention, there is provided a computer readable recording medium having recorded thereon a program for executing the method above.

The RUI client and the RUI server may follow the CEA-2014 standard.

According to another aspect of the present invention, there is provided a method allowing an RUI server to communicate with an RUI client, the method including: providing an UI page including a predetermined plug-in object to an RUI client; determining whether control ownership of an application of the RUI server is occupied by another RUI client when a first method of the plug-in object is executed; and notifying the RUI client of the result of the determination, wherein the UI page includes a script, which executes the first method when an event for opening the UI page is generated, and executes a second method of the plug-in object for obtaining the control ownership when the control ownership is not occupied by another RUI client.

The method may further include setting the control ownership into an occupiable state when a third method of the plug-in object for periodically notifying that the control ownership is occupied has not been executed by the RUI client occupying the control ownership after a predetermined time.

The method may further include: when a predetermined RUI client executes a fourth method of the plug-in object for releasing the control ownership, determining whether the predetermined RUI client occupies the control ownership; and selectively setting the control ownership into an occupiable state based on the result of the determination.

According to another aspect of the present invention, there is provided a computer readable recording medium having recorded thereon a program for executing the method of above.

According to another aspect of the present invention, there is provided an apparatus for providing an UI of an RUI server to an RUI client, the apparatus including: an UI provider, which provides an UI page including a predetermined plug-in object to the RUI client; a control ownership manager, which notifies the RUI client whether control ownership of an application of the RUI server is occupied by another RUI client when a first method of the plug-in object is executed, wherein the UI page includes a script, which executes the first method when an event for opening the UI page is generated, and executes a second method of the plug-in object for obtaining the control ownership when the control ownership is not occupied by another RUI client.

BRIEF DESCRIPTION OF THE DRAWINGS

The above and other features of the present invention will become more apparent by describing in detail exemplary embodiments thereof with reference to the attached drawings in which.

DETAILED DESCRIPTION OF THE INVENTION

Hereinafter, the present invention will be described more fully with reference to the accompanying drawings, in which exemplary embodiments of the invention are shown. The term "application" denotes an application of a remote user interface (RUI) server that can be controlled by an RUI client via a user interface (UI) page.

Figure 1:
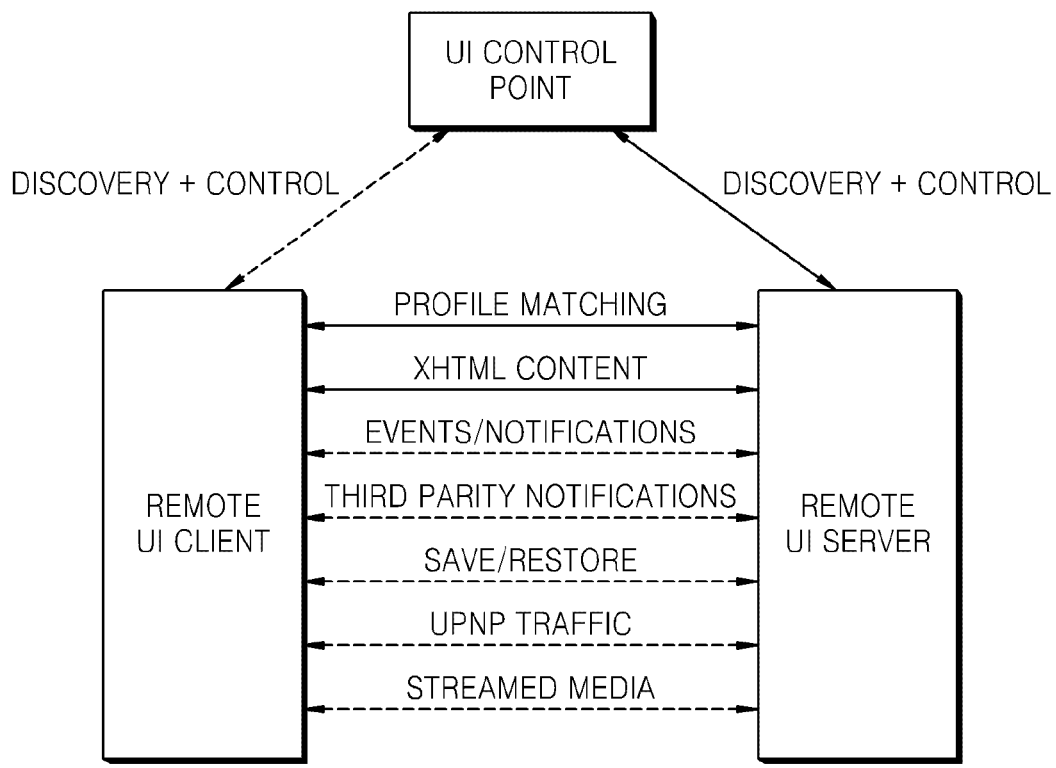
FIG. 1 is a diagram for describing a conventional communication method between a remote user interface (RUI) server and an RUI client according to the CEA-2014 standard.
Figure 2:
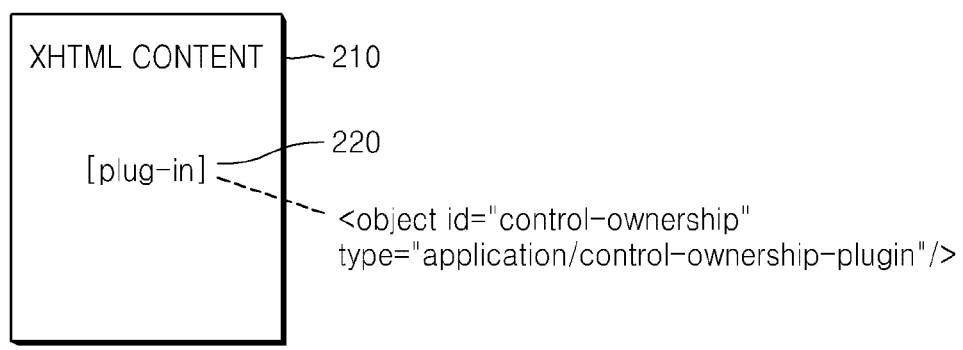
FIG. 2 is a diagram for describing a user interface (UI) page according to an embodiment of the present invention.

FIG. 2 is a diagram for describing an UI page according to an embodiment of the present invention.

The UI page transmitted from an RUI server to an RUI client is XHTML content 210, and the XHTML content 210 includes a plug-in object 220 for managing control ownership of an application. The plug-in object 220 is newly defined in the present application so as to manage control ownership of the RUI server, and not yet defined by XHTML. An XHTML browser of the RUI client should be able to analyze the plug-in object 220, but since the plug-in object 220 is for managing control ownership, the plug-in object 220 is not required to be shown to a user. The plug-in object 220 may be described in XHTML in the form of <object id="control-ownership" type="application/control-ownership-plugin"/>. Such a plug-in object 220 will now be referred to as a control ownership management object.

Figure 3:
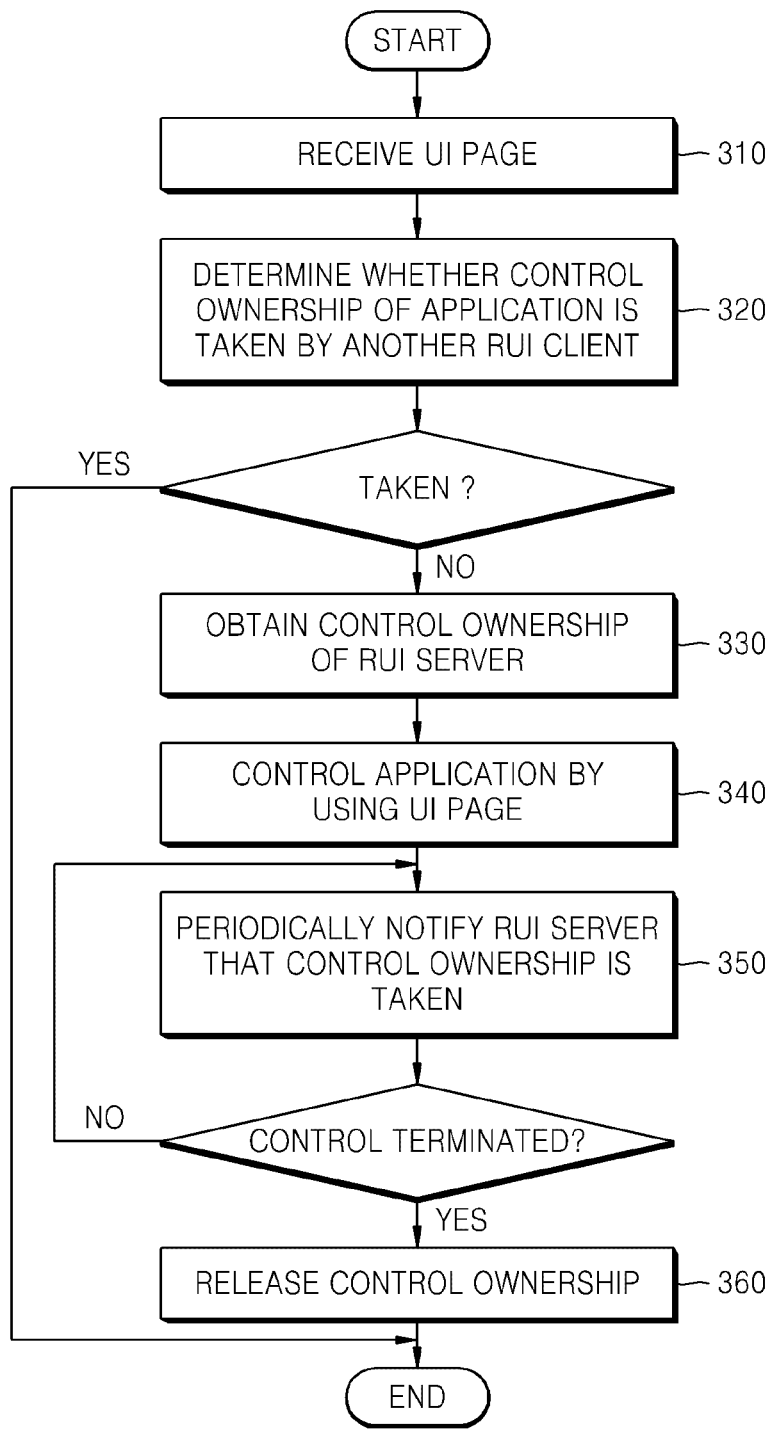
FIG. 3 is a flowchart illustrating a method allowing an RUI client to control an application of an RUI server according to an embodiment of the present invention.

Like other objects, the control ownership management object includes properties and methods, and control ownership of an application may be managed by using the properties and methods. For example, the following methods may be defined:

isFree( ): notify availability of control ownership for application takeOwnership(RUI Client Identifier): obtain control ownership of application releaseOwnership(RUI Client Identifier): Release control ownership of application notifyOwnership(RUI Client Identifier): notify that control ownership of application is taken FIG. 3 is a flowchart illustrating a method allowing an RUI client to control an application of an RUI server according to an embodiment of the present invention.

In operation 310, the RUI client receives an UI page form the RUI server.

In operation 320, the RUI client determines whether control ownership of an application is taken by another RUI client. Operation 320 can be performed as follows.

The UI page includes a script that executes isFree( ) of a control ownership management object when an event for opening the UI page by an XHTML browser of the RUI client is generated. Accordingly, when the UI page is loaded in the RUI client, the RUI client inquires the RUI server whether the control ownership of the application is available according to the script of the UI page.

In operation 330, if the control ownership is not taken as determined according to the script of the UI page, the RUI client obtains the control ownership. Such process may be performed by executing takeOwnership( ) of the control ownership management object. While obtaining the control ownership, an identifier of the RUI client is transmitted to the RUI server.

If the control ownership is taken by another RUI client, the UI page closes according to the script of the UI page, and the RUI client cannot access the corresponding application.

In operation 340, upon obtaining the control ownership, the RUI client controls the application through the UI page.

In operation 350, while the RUI client takes the control ownership according to the script of the UI page, the RUI client periodically notifies the RUI server that the control ownership is taken. Such a process can be performed by executing notifyOwnership( ) of the control ownership management object. The RUI client periodically notifies that it has the control ownership of the application so that when the RUI client is separated from a network without notifying the RUI server, the RUI server may set the control ownership as being obtainable.

In operation 360, when the controlling of the application is completed by an input of a user or the like, the RUI client releases the control ownership to the RUI server. Such a process can be performed by executing releaseOwnership( ) of the control ownership management object. The RUI client and the RUI server of the present invention may follow the CEA-2014 standard, and the same applies throughout the specification.

Figure 4:
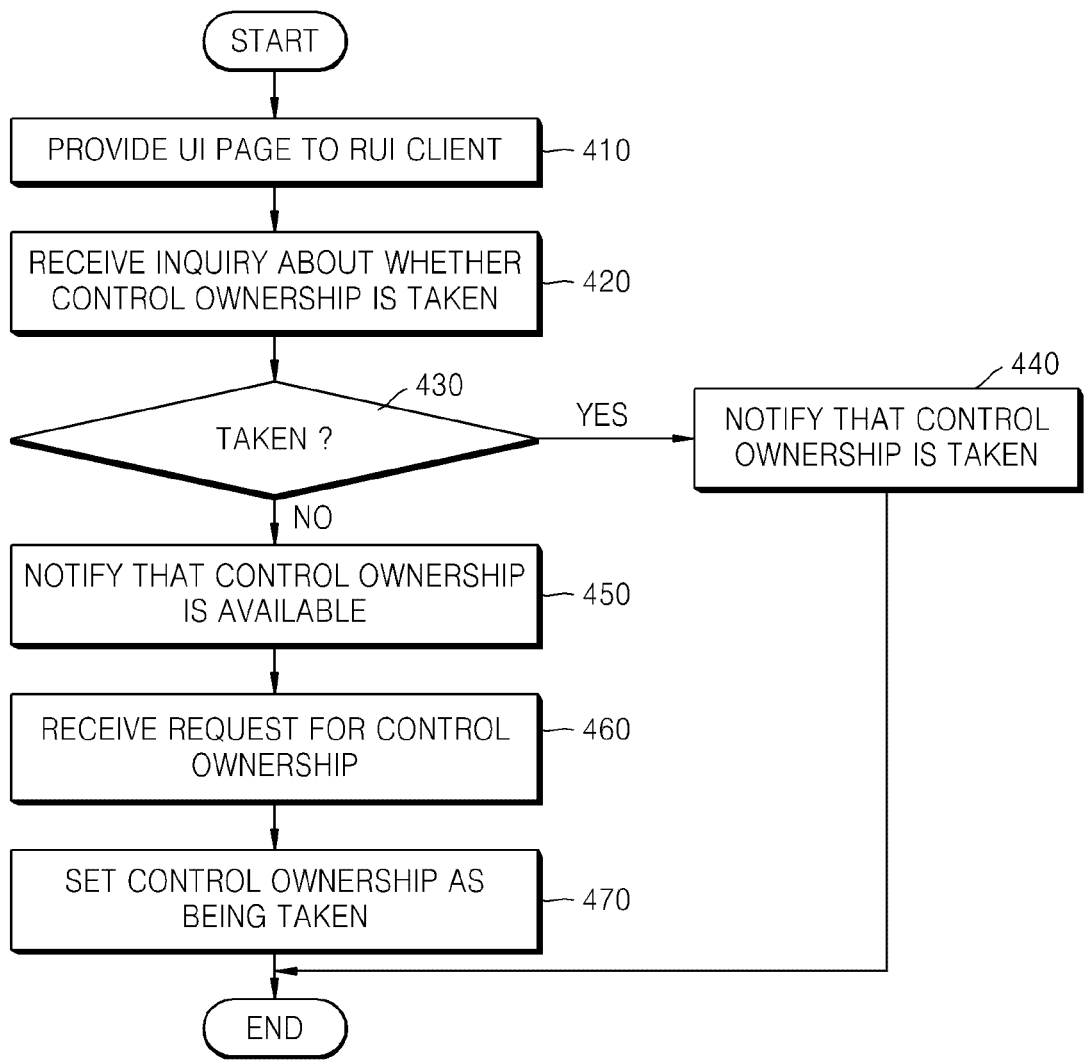
FIG. 4 is a flowchart illustrating a method allowing an RUI server to manage control ownership of an application according to an embodiment of the present invention.

FIG. 4 is a flowchart illustrating a method allowing an RUI server to manage control ownership of an application according to an embodiment of the present invention.

In operation 410, the RUI server provides an UP page to the RUI client.

In operation 420, the RUI server receives an inquiry about whether control ownership of an application is taken. This means that isFree( ) of a control ownership management object is executed while the RUI client opens the UI page.

In operation 430, the RUI server determines whether the control ownership of the application is taken. For this, the RUI server may refer to information stored in the application or separate information. Such information will now be described as management information. The management information includes an identifier of the RUI client that takes the control ownership of the application.

If the control ownership of the application is taken, this is notified to the RUI client that inquired whether the control ownership is taken in operation 440, If the control ownership of the application is not taken, it is notified to the RUI client that the control ownership is available in operation 450.

In operation 460, a request for the control ownership is received from the RUI client. This means that takeOwnership( ) of the control ownership management object is executed by the RUI client.

In operation 470, the RUI server sets the control ownership of the application as being taken by the RUI client. In other words, the management information is updated by recording an identifier of the RUI client in the management information.

Figure 5:
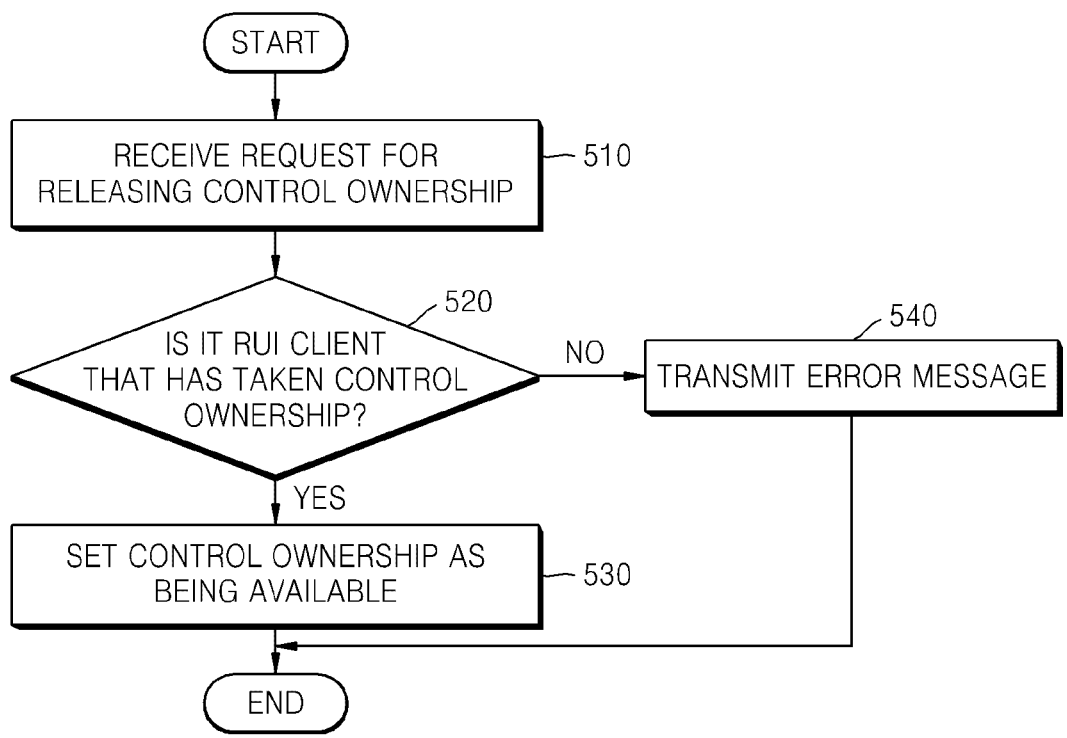
FIG. 5 is a flowchart illustrating a method allowing an RUI server to release control ownership according to an embodiment of the present invention.

FIG. 5 is a flowchart illustrating a method allowing an RUI server to release control ownership according to an embodiment of the present invention.

In operation 510, the RUI server receives a request for releasing control ownership of an application. This means that releaseOwnership( ) of a control ownership management object is executed by an RUI client. During operation 510, an identifier of the RUI client is transmitted to the RUI server.

In operation 520, the RUI server determines whether the RUI client that transmitted the request is an RUI client that currently has taken the control ownership. Operation 520 may be performed by comparing the identifier received during operation 510 and an identifier recorded in management information.

In operation 530, if the RUI client that transmitted the request is an RUI client that currently has taken the control ownership, the request is accepted, and the control ownership is set as being available.

In operation 540, if the RUI client that transmitted the request is not an RUI client that currently has taken the control ownership, an error message is transmitted.

Figure 6:
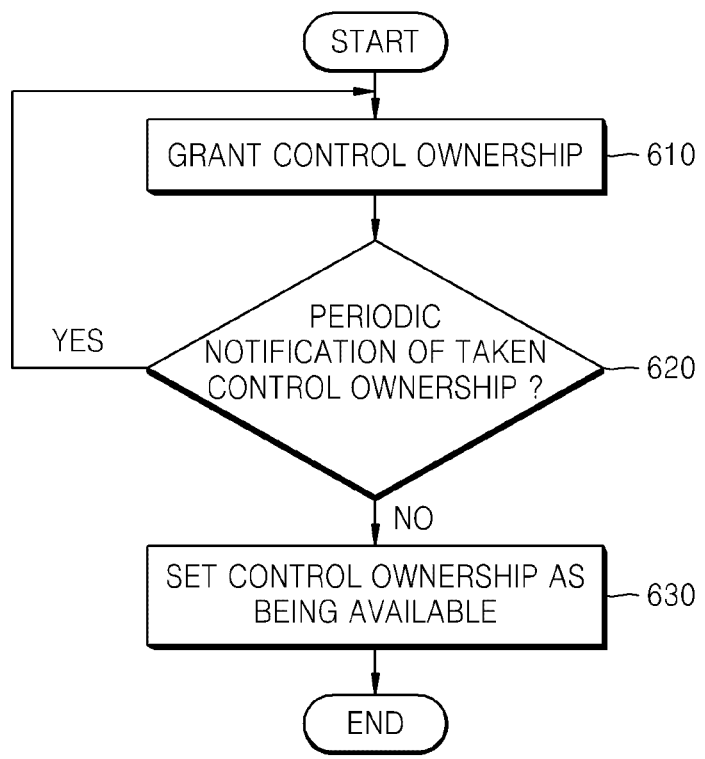
FIG. 6 is a flowchart illustrating a method allowing an RUI server to change a state of occupied control ownership according to an embodiment of the present invention.

FIG. 6 is a flowchart illustrating a method allowing an RUI server to change a state of taken control ownership according to an embodiment of the present invention.

In operation 610, the RUI server grants control ownership to an RUI client through the method described in FIG. 4.

In operation 620, the RUI server determines whether the RUI client that currently has taken the control ownership periodically notifies that the control ownership is taken. In other words, it is determined whether the RUI client periodically executes notifyOwnership( ) of a control ownership management object.

In operation 630, if the RUI client does not periodically notify that the control ownership is taken, i.e., if notifyOwnership( ) has not been executed by the RUI client after a predetermined time, the management information is changed so as to set the control ownership of the application to an available state.

Accordingly, when the RUI client that has taken the control ownership of the application is abnormally disconnected without releasing the control ownership, the RUI server can grant the control ownership to another RUI client.

Figure 7:
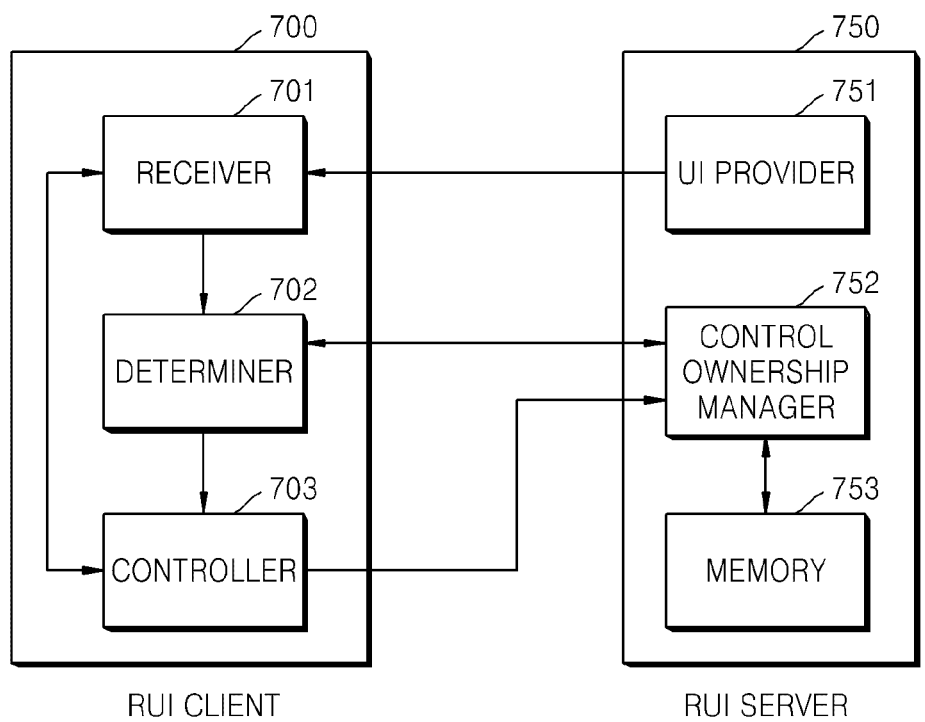
FIG. 7 is a diagram illustrating an RUI client and an RUI server according to an embodiment of the present invention.

FIG. 7 is a diagram illustrating an RUI client 700 and an RUI server 750 according to an embodiment of the present invention.

The RUI client 700 according to the current embodiment of the present invention includes a receiver 701, a determiner 702, and a controller 703.

The receiver 701 receives an UI page from the RUI server 750. The UI page includes a control ownership management object.

The determiner 702 determines whether an application is controlled by another RUI client by using the control ownership management object. In other words, when an event for opening the UI page is generated according to an script of the UI page, the isFree( ) method of the control ownership management object is executed.

If the control ownership of the application is available, the controller 703 obtains the control ownership by executing takeOwnership( ) of the control ownership management object, and controls the application via the UI page. Meanwhile, while taking the control ownership, the controller 703 periodically executes notifyOwnership( ) of the control ownership management object so as to periodically notify the RUI server that it owns the control ownership of the application. Also, when the controller 703 wishes to end the control of the application, releaseOwnership( ) of the control ownership management object is executed so as to release the control ownership.

The RUI server 750 includes an UI provider 751, a control ownership manager 752, and a memory 753.

The UI provider 751 provides the UI page for controlling the application of the RUI server 750 to the RUI client 700. Besides UI objects for controlling the application, the UI page includes a control ownership management object that is a plug-in object according to the present invention.

When the RUI client 700 executes isFree( ) of the control ownership management object, the control ownership manager 752 notifies the RUI client 700 whether the application is controlled by referring to management information stored in the memory 753.

If the control ownership is taken by another RUI client, this is notified. However, if the control ownership is available, the RUI client 700 executes takeOwnership( ) of the control ownership management object so as to request the control ownership. Accordingly, the control ownership is granted to the RUI client 700 by recording an identifier of the RUI client 700 in the management information.

The control ownership manager 752 determines whether the RUI client 700, which takes the control ownership, periodically executes notifyOwnership( ) of the control ownership management object, and if notifyOwnership( ) has not been executed after a predetermined time, the control ownership manager 752 determines that the RUI client 700 is disconnected from a network, and sets the control ownership as being available. In other words, the identifier of the RUI client 700 is deleted from the management information stored in the memory 753.

Meanwhile, when the RUI client 700 executes releaseOwnership( ) of the control ownership management object, the control ownership manager 752 determines whether the RUI client 700 currently has taken the control ownership by comparing the identifier of the RUI client 700 transmitted while executing releaseOwnership( ) and the identifier recorded in the management information. If it is determined that the RUI client 700 currently has taken the control ownership, the management information of the memory 753 is updated so as to set the control ownership as being available, and if not, an error message is transmitted to the RUI client 700.

According to the present invention, an RUI client can control an application of an RUI server without conflicting with another RUI client, even when a separate plug-in program is not installed in the RUI client.

The embodiments of the present invention can be written as computer programs and can be implemented in general-use digital computers that execute the programs using a computer readable recording medium. Examples of the computer readable recording medium include magnetic storage media (e.g., ROM, floppy disks, hard disks, etc.), and optical recording media (e.g., CD-ROMs, or DVDs). In another exemplary embodiment, computer readable recording medium includes storage media such as carrier waves (e.g., transmission through the Internet).

While this invention has been particularly shown and described with reference to preferred embodiments thereof, it will be understood by those skilled in the art that various changes in form and details may be made therein without departing from the spirit and scope of the invention as defined by the appended claims. The preferred embodiments should be considered in descriptive sense only and not for purposes of limitation. Therefore, the scope of the invention is defined not by the detailed description of the invention but by the appended claims, and all differences within the scope will be construed as being included in the present invention.

What is claimed is:

1. A method allowing a first remote user interface (RUI) client to control a home network device application of a RUI server, the method comprising:
   receiving a user interface (UI) page including a predetermined plug-in object, which manages ownership control of a home network device application, from the RUI server;
   determining whether the home network device application is already controlled by a second RUI client by using the predetermined plug-in object to inquire the RUI server whether the home network device application is already controlled by the second RUI client when the UI page is loaded in the first RUI client;
   obtaining control ownership of the home network device application by executing an obtaining method of the predetermined plug-in object, if it is determined that the home network device application is not controlled by the second RUI client; and
   periodically notifying the RUI server that the home network device application is controlled by the first RUI client, by periodically executing a notifying method of the predetermined plug-in object while controlling the home network device application.

2. The method of claim 1, wherein the first and the second RUI clients and the RUI server comply with the CEA-2014 standard.

3. The method of claim 1, wherein the determining comprises inquiring the RUI server whether the home network device application is controlled by the second RUI client, by executing an inquiry method of the predetermined plug-in object, when an event for opening the UI page is generated.

4. The method of claim 1, further comprising releasing control ownership of the home network device application by executing a release method of the predetermined plug-in object while controlling the home network device application.

5. A remote user interface (RUI) client comprising:
   a receiver which receives a user interface (UI) page including a predetermined plug-in object from an RUI server;
   a determiner which determines whether a home network device application of the RUI server is controlled by another RUI client by using the predetermined plug-in object to inquire the RUI server whether the home network device application is controlled by the another RUI client when the UI page is loaded in the RUI client; and
   a controller which obtains control ownership of the home network device application by executing an obtaining method of the predetermined plug-in object, when it is determined that the home network device application is not controlled by the another RUI client, and periodically notifies the RUI server that the home network device application is controlled by the RUI client by periodically executing a notifying method of the predetermined plug-in object while controlling the home network device application.

6. The RUI client of claim 5, wherein the RUI client, the another RUI client, and the RUI server comply with the CEA-2014 standard.

7. The RUI client of claim 5, wherein the determiner inquires the RUI server whether the home network device application is controlled by another RUI client, by executing in inquiry method of the predetermined plug-in object, when an event for opening the UI page is generated.

8. The RUT client of claim 5, wherein the controller releases control ownership of the home network device application by executing a release method of the predetermined plug-in object while controlling the home network device application.

9. A non-transitory computer readable recording medium having recorded thereon a program for executing a method allowing a first remote user interface (RUI) client to control a home network device application of a RUI server, the method comprising:
   receiving a user interface (UI) page including a predetermined plug-in object from the RUI server;
   determining whether the home network device application is controlled by a second RUI client by using the predetermined plug-in object to inquire the RUI server whether the home network device application is controlled by the second RUI client when the UI page is loaded in the first RUI client;
   obtaining control ownership of the home network device application by executing an obtaining method of the predetermined plug-in object, if it is determined that the home network device application is not controlled by the second RUI client; and
   periodically notifying the RUI server that the home network device application is controlled by the first RUI client, by periodically executing a notifying method of the predetermined plug-in object while controlling the home network device application.

10. A method allowing a remote user interface (RUI) server to communicate with an RUI client, the method comprising:
provide a user interface (UI) page including a predetermined plug-in object to a first RUI client;
receiving, from the first RUI client through the predetermined plug-in object, an inquiry about whether control operation of a home network device application is taken, wherein the inquiry is provided to the RUI server when the UI page is loaded in the first RUI client;
determining, in response to the inquiry, whether control ownership of the home network device application of the RUI server is taken by a second RUI client when a first method of the predetermined plug-in object is executed; and
notifying the first RUI client of a result of the determination,
wherein the UI page includes a script, which executes the first method when an event for opening the UI page is generated, and executes a second method of the predetermined plug-in object for obtaining the control ownership when the control ownership is not taken by the second RUI client.

11. The method of claim 10, wherein the first and the second RUI clients and the RUI server comply with the CEA-2014 standard.

12. The method of claim 10, further comprising setting the control ownership into a not taken state when a method of the predetermined plug-in object for periodically notifying that the control ownership is taken has not been executed by the second RUI client that has taken the control ownership after a predetermined time.

13. The method of claim 10, wherein the determination is a first determination, the method further comprising:
when a predetermined RUI client executes a method of the predetermined plug-in object for releasing the control ownership, determining, in a second determination, whether the predetermined RUI client has taken the control ownership; and
selectively setting the control ownership into a not taken state based on a result of the second determination.

14. An apparatus for providing a user interface (UI) of a remote user interface (RUI) server to a first RUI client, the apparatus comprising:
an UI provider, which provides an UI page including a predetermined plug-in object to the first RUI client;
a control ownership manager, which:
receives, from the first RUI client through the predetermined plug-in object, an inquiry about whether control operation of a home network device application is taken, wherein the inquiry is provided to the RUI server when the UI page is loaded in the first RUI client,
determines, in response to the inquiry, whether control ownership of a home network device application of the RUI server is taken by a second RUI client when a first method of the predetermined plug-in object is executed, and
notifies the first RUI client whether control ownership of a home network device application of the RUI server is taken by a second RUI client when a first method of the predetermined plug-in object is executed,
wherein the UI page includes a script, which executes the first method when an event for opening the UI page is generated, and executes a second method of the predetermined plug-in object for obtaining the control ownership when the control ownership is not taken by the second RUI client.

15. The apparatus of claim 14, wherein the first and the second RUI clients and the RUI server comply with the CE-2014 standard.

16. The apparatus of claim 14, wherein the control ownership manager sets the control ownership to a not taken state when a third method of the predetermined plug-in object for periodically notifying that the control ownership is taken is not executed by the second RUI client that has taken the control ownership for a predetermined time.

17. The apparatus of claim 14, wherein, when a method of the predetermined plug-in object for releasing the control ownership is executed, the control ownership manager determines, in a determination, whether a RUI client that executed the fourth method has taken the control ownership, and selectively sets the control ownership to a not taken state based on a result of the determination.

18. A non-transitory computer readable recording medium having recorded thereon a program for executing a method allowing a remote user interface (RUI) server to communicate with an RUI client, the method comprising:
providing a user interface (UI) page including a predetermined plug-in object to a first RUI client;
receiving, from the first RUI client through the plug-in object, an inquiry about whether control operation of a home network device application is taken, wherein the inquiry is provided to the RUI server when the UI page is loaded in the first RUI client;
determining, in response to the inquiry, whether control ownership of a home network device application of the RUI server is taken by a second RUI client when a first method of the predetermined plug-in object is executed; and
notifying the first RUI client of a result of the determination,
wherein the UI page includes a script, which executes the first method when an event for opening the UI page is generated, and executes a second method of the predetermined plug-in object for obtaining the control ownership when the control ownership is not taken by the second RUI client.

19. The method of claim 1, wherein the determination is performed without using an agent.

* * * * *